United States Patent [19]
Barnscheidt

[11] 4,331,534
[45] May 25, 1982

[54] METHOD OF AND ARRANGEMENT FOR THE DE-INKING OF PULP SUSPENSIONS

[75] Inventor: Wolfgang Barnscheidt, Dormagen-Straberg, Fed. Rep. of Germany

[73] Assignees: Feldmühle Aktiengesellschaft, Duesseldorf, Fed. Rep. of Germany; E+M Lamort S.A., Vitry-le-Francois, France

[21] Appl. No.: 194,243

[22] PCT Filed: Aug. 18, 1979

[86] PCT No.: PCT/DE79/00090

§ 371 Date: Apr. 21, 1980

§ 102(e) Date: Apr. 21, 1980

[87] PCT Pub. No.: WO80/00423

PCT Pub. Date: Mar. 20, 1980

[30] Foreign Application Priority Data

Aug. 21, 1978 [DE] Fed. Rep. of Germany ....... 2836496
Apr. 10, 1979 [DE] Fed. Rep. of Germany ....... 2914392

[51] Int. Cl.³ .................... B03D 1/24; D21B 1/32; D21C 5/02
[52] U.S. Cl. ................... 209/164; 209/170; 162/4
[58] Field of Search ............ 209/164, 168, 170, 165; 162/4, 6

[56] References Cited

U.S. PATENT DOCUMENTS

| | | | |
|---|---|---|---|
| 3,428,175 | 2/1969 | Hukki | 209/164 |
| 3,870,635 | 3/1975 | Clarke-Pounder | 209/168 X |
| 4,157,952 | 6/1979 | Krofta | 209/170 |
| 4,212,730 | 7/1980 | Brooks et al. | 209/168 |

*Primary Examiner*—Ralph J. Hill
*Attorney, Agent, or Firm*—Toren, McGeady and Stanger

[57] ABSTRACT

A pulp suspension of waste paper which is laden with air bubbles is introduced into a flotation cell. Fine air bubbles rise through the pulp suspension toward the top. Printing ink and other impurities are deposited on the bubbles which form a foam layer on the surface of the pulp suspension. The foam which is laden with impurities is drawn off from the surface. The fibers which have been subjected to preliminary purification in this manner sink downwardly. For reducing the number of cells connected in series to fewer than a third, while obtaining the same degree of whiteness, the fibers which were subjected to preliminary purification are drawn off and are once again supplied to the flotation cell in the form of an air-laden pulp suspension. Alternatively, instead of the air-laden pulp suspension, a water-air suspension can be injected. The air bubbles which are thus introduced once again rise toward the top and traverse the sinking fibers in a counterflow. As a result, an intensive air-pulp contact is created.

18 Claims, 5 Drawing Figures

METHOD OF AND ARRANGEMENT FOR THE DE-INKING OF PULP SUSPENSIONS

The invention relates to a method of and an arrangement for the de-inking of pulp suspensions by means of flotation, wherein the pulp suspension which is laden with air is introduced in a flotation cell, the foam forming on the surface of the pulp suspension is removed together with the impurities and the purified pulp suspension—accept—is drawn off.

The purification of pulp suspensions, as they are generally produced from waste paper, has been the state of the art for a long time. Conventional methods operate in such a way that, in a trough which is equipped with a porous plate in its bottom region, compressed air is applied underneath this plate which compressed air passes through the pulp suspension above the plate in the form of air bubbles, so that the dirt particles can cling to the air bubbles and be carried to the surface of the trough together with the air bubbles. The pulp suspension is continuously conducted through this trough and the foam accumulating at the surface of the trough is paddled, sprayed or blown off. The statistical probability that a dirt particle can deposit on an air bubble in these known units is about 50%, because it is not ensured that the entire pulp suspension flow introduced into the trough is intimately mixed with the rising air bubbles. In order still to obtain a satisfactory purification of the pulp suspension, generally 10 similar cells are connected in series; the pulp suspension must flow through all of these cells before approximately the whiteness of the unprinted raw material is reached.

In order to reduce these significant expenses, in German Offenlegungsschrift No. 27 12 947, a de-inking tower has already been proposed in which the pulp suspension must initially pass through a mixing chamber before it reaches the actual flotation cell. In this mixing chamber, to which compressed air and pulp suspension are admitted, the pulp suspension passes through a controllable gap which is characterized by a porous wall on the one side and an impervious wall on the opposite side. The air flows under pressure through the porous wall into the pulp suspension; this results in an optimum distribution because the gap of the mixing chamber is relatively narrow and, therefore, the liquid film formed by the pulp suspension is very thin. The intimate mixing of air and pulp suspension in connection with the blowing off of the foam, results in an improved efficiency in this unit, so that the number of passages, to wit, the number of stages through which the pulp suspension must be conducted, can be reduced from 10 to 4.

In the flotation cell according to German Offenlegungsschrift No. 27 12 947, the air-laden pulp suspension is supplied to the first cell in the bottom region and the primary accept obtained by the flotation is also removed in the bottom region and the primary accept is fed to the second cell and leaves the cell as secondary accept, etc. Prior to being fed to the next cell, the accept must once again pass through a compulsory mixing chamber in which it is once again charged with air. However, the simultaneous supply and removal of pulp suspension in the bottom region give rise to the great danger that dirt particles, before they can rise toward the top with the air bubbles, are transported through the accept outlet into the next cell where the same danger exists again. Consequently, in spite of the satisfactory air charge of the pulp suspension, this leads to a deterioration of the statistical result, i.e., a plurality of cells must inevitably be connected in series in order to obtain a whiteness of the pulp which approximately corresponds to the original material, because the probability that dirt particles will reach the accept can only be reduced by connecting a plurality of cells in series.

Therefore, the present invention is based on the task of further reducing the number of purification stages required in the past in flotation cells and, if possible, of requiring only a single cell and of essentially preventing the passing of dirt particles through the accept outlet. Simultaneously, the required capital investment for de-inking plants should be lowered and the required space should be reduced. Moreover, the plant should be easy to clean and it should be possible to operate the plant with minimum maintenance.

The above-mentioned task is solved through a method of de-inking pulp suspension by means of flotation, wherein the air-laden pulp suspension is introduced into a flotation cell, the foam forming on the surface of the pulp suspension is removed together with the impurities and the purified pulp suspension, i.e. accept, is drawn off, with the characterizing feature that the air-laden pulp suspension is supplied to the top region of a flotation cell, a portion of the accept is drawn off in the bottom region of the flotation cell as purified pulp suspension and an air-water suspension is supplied to the flotation cell in the region above the accept outlet and is conducted in the counterflow to the sinking accept fiber.

The method is preferably performed by means of an arrangement which includes an annular flotation cell to which there are assigned units for drawing off foam and for aeration and units for supplying and removing pulp suspension, and which is characterized by the combination of the following features:

In the flotation cell,
(a) the inlet pipe or pipes for fiber suspension are arranged between 300 and 1000 mm below the level of the pulp suspension,
(b) the outlet pipe is arranged approximately on the level of the bottom, and
(c) the after-aeration pipe or pipes are arranged 300 to 500 mm above the outlet pipe and 300 to 1100 mm below the inlet pipe or pipes.

The connections for introducing the air-water suspension in the flotation cell can be constructed either as threaded connections or as flanged connections. They are perferably connected to injector nozzles or Venturi nozzles; however, they can also be connected to aeration chambers as they are described in German Offenlegungsschrift No. 27 12 947. The foaming units, i.e. the mixing chamber as well as the injectors, can be flanged directly to the connections, however, it is also possible to arrange them separately from the annular flotation cell and to connect them through pipes to the connections, wherein the pipes could possibly also be replaced by hose connections. The separate arrangement would always be appropriate when, because of the composition of the materials in the flotation cell, it must be expected that the injectors or the mixing chamber become obstructed, i.e. clogged and ineffective. The separate arrangement level with the ground provides for a better accessibility and, thus a quicker maintenance and cleaning of the foaming units.

Advantageously, a check valve each are arranged in front of and behind the injectors, so that the injectors, in the case of a possible clogging, can be removed and cleaned quickly and without shutting down the flotation cell. In this regard, it is of no consequence whether the injectors are arranged separately or flanged directly to the flotation cell, because, by arranging the injectors between valves, the ease of maintenance of the flotation cell is increased in any case.

In accordance with the invention, the air-laden pulp suspension is supplied in the upper region of the flotation cell, so that the air bubbles which are laden with dirt particles move on a relatively short distance toward the surface where they are drawn off in the form of foam. It is important in this connection that this distance is not too long since, otherwise, when several small air bubbles are combined to a larger air bubble, the surface area of the air bubbles is reduced which inevitably leads to a loss of dirt particles. Nevertheless, individual air bubbles will still lose their dirt particle load on their travel toward the top which load sinks further downwardly together with the remainder of the pulp suspension. As a result, the load reaches the region of the injection of an additional air-water suspension where, in accordance with the technical teaching of this invention, air bubbles are once again made available to the load which air bubbles, in this case, pass through an already essentially purified stock. To the pulp which, since the accept is discharged in the bottom region, passes through the annular flotation cell from top to bottom, air bubbles are admitted according to the counterflow principle, i.e. a multitude of micro-air bubbles are offered to the dirt particles; as a result, the probability that even the last small dirt is picked up is significantly increased. Thus, already in a single flotation cell, an accept is obtained with a degree of whiteness as it could be obtained in the past only after passing through a plurality of de-inking cells arranged in series.

A very important embodiment of the invention provides that the additional air-water suspension is an accept which is conducted in circulation. It is basically possible to use pure water and air for the secondary aeration of the flotation cell. Advantageously, return water is used for this purpose in order to save raw material and also energy, because the entire process must take place at temperatures of about 45° C. However, in addition to these savings, the preferred circulating conduction of the accept facilitates a much better charging of the returned amount of accept with air and, therefore, a higher purification effect because, by the injection of air into the returned accept, the air is better distributed by the fibers contained in the accept.

Of course, it is possible to supply the obtained accept once again to another identically constructed plant as described hereinabove, whereby it is still possible to obtain, compared to the de-inking flotation plants used in the past, a significant advantage with respect to the required space, energy and investment and, above all, an accept of an even better whiteness.

A particular advantage of returning a portion of the accept with renewed aeration resides in the fact that this only insignificantly changes the consistency of the pulp suspension. This insignificant change is caused by drawing off the foam.

However, if a dilution of the pulp suspension is desirable, it may be advantageous to forego either entirely or partially the returning and foaming of the accept in the annular flotation cell and to inject air-laden water instead.

The returned amount of accept is advantageously between 10 and 150% of the entire accept. By regulating the return amount, it is possible to adjust the total amount of air supplied; in other words, in especially highly impure suspensions, it is possible to increase the amount of the returned accept in order to obtain an excellent purification of the suspension, while, in less impure pulp suspensions, the returned amount of accept can be maintained at the lower limit. It should be noted that this returning of a portion of the accept which is once again charged with air does not change the amount passing through the cell. The return of the accept represents a special independent internal circulation which has no influence on the amount passing through.

An especially advantageous embodiment of the invention provides that the air-laden pulp suspension is supplied to the flotation cell at several locations distributed over the entire circumference. In this case, the pulp suspension is fed into a ring pipe from which it is supplied to the individual connections. The supply is advantageously effected under an angle $\alpha$ between 10° and 55° relative to the tangent of the flotation cell in order to impart a circular motion to the pulp suspension. By distributing the connection points over the circumference of the flotation cell, a more uniform distribution of the air bubbles is achieved in the entire space. Simultaneously, particularly by the supply under a certain angle $\alpha$ relative to the tangent of a circularly constructed flotation cell, it is possible to impart a circular motion to the pulp suspension. The circular motion causes the foam accumulating on the suspension also to move, so that it is possible to draw off the foam at only one or two locations, i.e. it is not required that the drawing off of the foam extends over the entire surface area of the annular cell. In the previously known system, either moving parts, such as paddles, or a blowing off of the foam is required. Both are more complicated than the method according to the invention.

In this connection, also the distance of the inlet point of the pulp suspension from the liquid level is important, because the almost perpendicularly rising air bubbles impair the circular motion of the pulp suspension. Accordingly, a nozzle ring which is arranged too low not only increases the danger of the formation of large air bubbles which leads to a poorer purification of the pulp suspension, but has the additional disadvantage that a circular motion of the foam on the surface is not obtained and, therefore, cumbersome measures for drawing off the foam are required which may lead to the additional disadvantage that dirt particles are once again separated from the foam bubbles.

The additional air-water suspension for the secondary aeration is advantageously also supplied at several locations distributed over the circumference of the flotation cell. Also in this case, the distribution can be effected through a ring pipe from where it is supplied to the individual injectors. The supply is advantageously under an angle $\alpha$ of between 0° and 30° relative to the tangent of the flotation cell in order to impart a circular motion to the pulp suspension. By distributing the connection points over the circumference of the second section of the flotation cell, a more uniform distribution of the air bubbles is achieved in the entire flotation cell. By the supply under a certain angle $\alpha$ relative to the tangent of the circularly constructed flotation cell for the pulp suspension and the resulting circular motion, the foam accumulating on the pulp suspension is also moved, so that it is possible to draw off the foam at only one or two locations, i.e. it is not required that the drawing off of the foam extends over the entire surface area of the flotation cell. In the previously known systems, either moving parts, such as paddles, or a blowing off of the foam is required.

In this connection, it is important that a certain distance remains between the after-aeration pipe, i.e. the pipe or pipes through which the additional air-water suspension, preferably returned accept, is supplied to the flotation cell, and the outlet pipe, because air bubbles could otherwise leave the flotation cell directly through the accept outlet. In the latter case, the air bubbles do not have the intended effect, i.e. the purification of the pulp suspension, but leave the flotation cell and could then possibly lead to the formation of undesired foam at the overflow or also to breakdown of the pumps.

An advantageous embodiment of the invention provides that the inlet pipes and after-aeration pipes are directly connected to injectors. Accordingly, the injectors, possibly with the intermediate arrangement of a valve, are arranged directly at the flotation cell, so that the mixing of air and water or pulp suspension takes place immediately prior to reaching the flotation cell and, because of the short distance, a segregation is not possible.

Another advantageous embodiment of the invention provides that the injectors are connected to rising pipes for taking in air which pipes are transparent at least in the immediate region of the injectors. Due to this feature of the invention, it is possible to determine whether or not a nozzle is clogged. When the unit is in operation, air is taken in through the rising pipes, i.e. the transparent portion of the rising pipes must be clean and clear. If this is not the case, the injector is clogged and does not operate. In this case, pulp suspension enters the transparent rising pipes in accordance with the level of the pulp suspension in the flotation cell. Accordingly, constructing the rising pipes as transparent pipes at least in the lower region, provides the simple possibility of controlling the operativeness of the injector.

Another embodiment of the invention provides that the rising pipes extend above the filling level of the flotation cell. When the rising pipes project above the filling level of the flotation cell, the cell can be taken out of operation also in the filled state without pulp suspension being discharged. Simultaneously, when the flotation cell is not in operation, it can be recognized to what extent the cell is filled.

An especially preferred embodiment of the invention provides that the injectors are provided with replaceable inserts, wherein these inserts advantageously consist of mechanically resistant material. The nozzle body proper can be made of metal or advantageously also of plastics material, because, although subjected to aggressive media, it is subjected only to little wear. On the other hand, the insert, i.e. the narrowest point, is subjected to special wear and, therefore, is made of a material as hard as possible, for example, a high-alloy steel or, in an especially preferred embodiment of the invention, of a mechanically resistant material, such as sintered oxide ceramics. However, the replaceability of the insert offers another significant advantage. The amount of air which is supplied to the suspension can be controlled by selecting different diameters of the inserts, i.e. the inside width of the inserts. The greater the difference between the inside width of the insert and the inside width of the nozzle body—wherein, of course, the bore in the nozzle body is larger than that of the insert—the more air is supplied to the pulp suspension. Accordingly, it is possible, also in an existing plant, to change within a short time the amount of air which passes through by replacing the inserts.

An advantageous embodiment of the invention provides that the flotation cell is constructed as an annular cell wherein, in accordance with an especially preferred embodiment of the invention, the outer diameter of the annular cell is 1.5 to 3 times the core diameter of the annular cell. Generally, the flotation cell can have any cross-sectional shape. For example, it could be oval or also polygonal. However, in these cases, spaces could be easily formed which are not reached by the flow, so that dirt could accumulate in these spaces. This is particularly true for the outer region of the cells, while another problem is important in the inner region of the cell, i.e. at the core. As is well known, in rotating liquids, the velocity of rotation increases toward the center, because a vortex is formed. However, in a flotation cell, this vortex formation is highly undesirable because this significantly reduces the purification effect of the cell. Therefore, it has been found advantageous to leave out the core region of a flotation cell in order thereby to avoid the vortex formation. The most advantageous flow conditions are obtained in a cell in which the outer diameter of the annular flotation cell is 1.5 to 3 times the core diameter.

Another very advantageous embodiment of the invention resides in a method of de-inking pulp suspensions by means of flotation, with the characterizing feature that, in a divided flotation cell, the pulp suspension which rises from the bottom region of a first section flows over a weir provided between the first and the second sections, sinks downwardly in the second section and is drawn off at the bottom region, while, simultaneously, an air-water suspension is supplied in a counterflow and the foam accumulating on the surface of the suspension of both sections is drawn off.

The method is preferably performed in an arrangement which is characterized by two annular cells which are arranged essentially concentrically relative to each other and are separated from each other by a weir which facilitates the overflow of pulp suspension from the first annular cell into the second annular cell, and by connections at the first annular cell for introducing air-laden pulp suspension, an accept outlet in the bottom region of the second annular cell, at least one connection on the second annular cell for supplying an additional air-water suspension and a device for drawing off the accumulating dirt-laden foam in the top regions of both annular cells.

Accordingly, in this embodiment of the method and the arrangement, the secondary aeration of the already essentially purified pulp suspension and the conduction in the counterflow according to the invention takes place only in the second annular cell and the pulp suspension is supplied to the latter by flowing over the weir arranged between the two sections. On the other hand, the first annular cell into which the air-laden pulp to be purified is injected, the flow of pulp and air is in the same direction. This treatment stage, arranged in series so to speak, has the advantage that more time and distance is available for the depositing of the air bubbles on the dirt particles, so that this variation offers advantages especially in highly impure pulps.

In more detail, the following takes place in this embodiment:

By the division of a flotation cell into a first and a second cell portion, wherein the foamed pulp suspension is supplied to the first portion, i.e. the first section of the flotation cell, all dirt particles which have been deposited on air bubbles are transported to the surface of the pulp suspension and are removed at the surface in the form of foam by the draw-off device. However, individual air bubbles lose their dirt load on their way to the top and some of the dirt particles may possibly not have found an air bubble during the foaming process for transporting them. These dirt particles, if they cannot be deposited on still rising air bubbles, are washed over the weir into the second cell and, thus, reach a flow which transports them downwardly in the direction of the accept outlet. To prevent this sinking and, thus, the remaining of these dirt particles in the accept, according to the invention, to this second section an air-water suspension is admitted which, from the bottom region, above the accept outlet, flows through the section against the sinking direction of the dirt particles. As a result, a multitude of micro-air bubbles are once again offered to the dirt particles and, additionally, an intimate mixing takes place because of the counterflow motion which significantly increases the probability that even the last small dirt particle is picked up. An optimum purification effect is achieved by the combination of weir and counterflow, i.e. by the separation of inlet and outlet of the pulp suspension. Also in this variation of the arrangement and the method, a plurality of flotation cells according to the method of the invention can be arranged in series and further improve the whiteness.

The accept outlet advantageously consists of an overflow which is connected at the bottom of the second annular cell and extends outside of the annular cell essentially up to the level of the weir. By constructing the accept outlet as an overflow, the level of the pulp suspension is automatically regulated without requiring complicated control devices for this purpose. In designing the flotation cell, merely the size of the overflow must be dimensioned in accordance with the ratio of the inlet and the maximum amount of accept returned into the second annular cell, in order to facilitate a trouble-free, continuous operation.

A very advantageous embodiment of the invention provides that the weir between the first and the second annular cells is 30 to 150 mm below the level of the pulp suspension. After all, the height of the level of the pulp suspension of the weir can be adjusted by the height of the overflow. However, this height has an increased importance inasmuch as it represents a criterion for the flow rate of the pulp suspension, i.e., in the case of a small difference of the levels between weir and pulp suspension, the pulp suspension must flow over the weir with a significant higher flow rate than would be the case in a lower height of the weir level. However, the flow rate should be kept relatively low, so that the air bubbles are not impaired in their movement toward the top and lose their dirt particle load by a possibly created turbulence. However, on the other hand, the weir may not differ too much from the level of the pulp suspension since, otherwise, their is the danger that dirt particles will reach the downward current of the second annular cell without reaching the surface and, as a result, will contaminate the accept in the second annular cell. Therefore, the above stated range of 30 to 150 mm below the level of the pulp suspension as the distance from the weir is of significant importance. Particularly advantageous is a range of between 80 and 120 mm.

The connections for supplying an additional air-water suspension into the second annular cell are advantageously 100 to 300 mm above the accept outlet. Of course, it is desirable to keep the travel path of the air bubbles through the pulp suspension as long as possible in order to achieve a good purification effect. For this reason, the connections must be arranged as closely as possibly in the vicinity of the bottom of the second annular cell. However, the accept outlet is also arranged in this region, so that there is the possibility that freshly injected air-water suspension is drawn off directly through the accept outlet. To significantly reduce this danger, a distance of about 200 mm between accept outlet and the connection for injecting the air-water suspension is required. The optimum position of the injection of the counterflow aeration is about 1 to 2 m below the weir. In the case of a small distance, too strong a turbulence would impair an optimum rotation of the dirt particles. Too low a position results in the disadvantage that the desired circular motion becomes too weak.

Another preferred embodiment of the invention provides that the first annular cell to which the pulp suspension is admitted in uniflow is the inner annular cell and the second annular cell to which the pulp suspension is admitted in counterflow is the outer annular cell. This arrangement results in a structurally simple possibility for arranging overflow, accept outlet and inlet pipes. However, it is important in this connection that, by arranging the second annular cell as the outer annular cell, the surface is increased and, therefore, a slowdown of the flow rate of the pulp suspension is achieved. The air bubbles and the dirt particles clinging to the air bubbles which rise in the pulp suspension are provided a larger area for rising by the outer annular cell, i.e., the flow rate is slowed down. This reduces the danger that the individual air bubble will lose the adhering dirt particles. Moreover, the danger of the creation of turbulences is further reduced and it is thereby also avoided that dirt particles clinging to air bubbles will separate from the air bubbles. The injection of the air-water suspension under a certain angle $\alpha$ relative to the tangent in the second annular cell is not contradictory to prevent turbulences. The angle $\alpha$, preferably 10° to 30° relative to the tangent, is chosen and adjusted to the velocity of injection in such a way that no turbulences occur, but only a slight circular motion of the entire pulp suspension.

Advantageously, the injectors for supplying the pulp suspension in the inner annular cell and the outer annular cell are arranged at an angle of 10° to 30° relative to the tangent, wherein the nozzles in at least one of the annular cells are arranged at different angles relative to one another. The arrangement of the nozzles at different angles results in a better distribution of the pulp suspension over the annular cross-sectional area, i.e. the entire annular cross-sectional area is covered in the manner of a fan. This fan-like coverage prevents the formation of dead corners where pulp could possibly accumulate. Accordingly, the injection of the pulp suspension results in a self-cleaning of the unit, whereby maintenance is reduced and facilitated.

EXAMPLE I

Waste paper, consisting to 20% of wood-free files and to 80% of beaten print, is disintegrated in a pulper. The consistency of the pulp is 5%. Relative to the waste paper furnished, the following weight percentages are added in chemicals:

1%: $H_2O_2$
1.5%: NaOH
5%: water glass
1.3%: washing agent

The time of stay in the pulper is about 30 minutes, the pulp consisting of the two waste paper components has a whiteness of 52°.

After leaving the pulper, the pulp suspension is added to a stirring vat, where it remains for 2 hours in order to enable the added chemicals to become effective under continuous stirring. The consistency of the pulp suspension in the stirring vat is also 5%. After diluting the pulp suspension to a consistency of 1%, the suspension is added to the flotation arrangement according to the invention, through which it passes with such a flow rate that the time of stay is about 7 minutes. After leaving the flotation arrangement, the pulp has a final whiteness of 62°. Subsequently, the pulp is added to a thickener, wherein the accumulating return water serves once again for diluting the pulp which is conducted to the flotation stage, to wit, it serves for adjusting to a consistency of 1%.

EXAMPLE II

Waste paper, consisting to 50% of newsprint and to 50% of magazine print, is disintegrated in a pulper. The consistency of the pulp is 5%. Relative to the waste paper furnish, the following percentages by weight are added in chemicals:

1%: $H_2O_2$
1.5%: NaOH
5%: Water glass
1%: Soap-Olinor, registered trademark of the Company Henkel The time of stay in the pulper is about 30 minutes.

The suspension is heated by the addition of steam to a temperature of between 30° and 45° C.

The pulp consisting of the two waste paper components has a whiteness of 50°. After leaving the pulper, the pulp suspension is added to a stirring vat, where it remains for 2 hours in order to enable the added chemicals to become effective under continuous stirring. The consistency of the pulp suspension in the stirring vat is also 5%.

After diluting the pulp suspension to a consistency of 1%, it is added to the flotation arrangement according to the invention through which it passes with such a flow rate that the time of stay is about 7 minutes. After leaving the flotation arrangement, the pulp has a whiteness of 62°. Subsequently, the pulp is added to a thickener wherein the accumulating return water once again serves for diluting the pulp which is conducted to the flotation stage, to wit, it serves for adjusting to a consistency of 1%.

In the following, the invention shall be described with the aid of the drawing.

Figure 1:
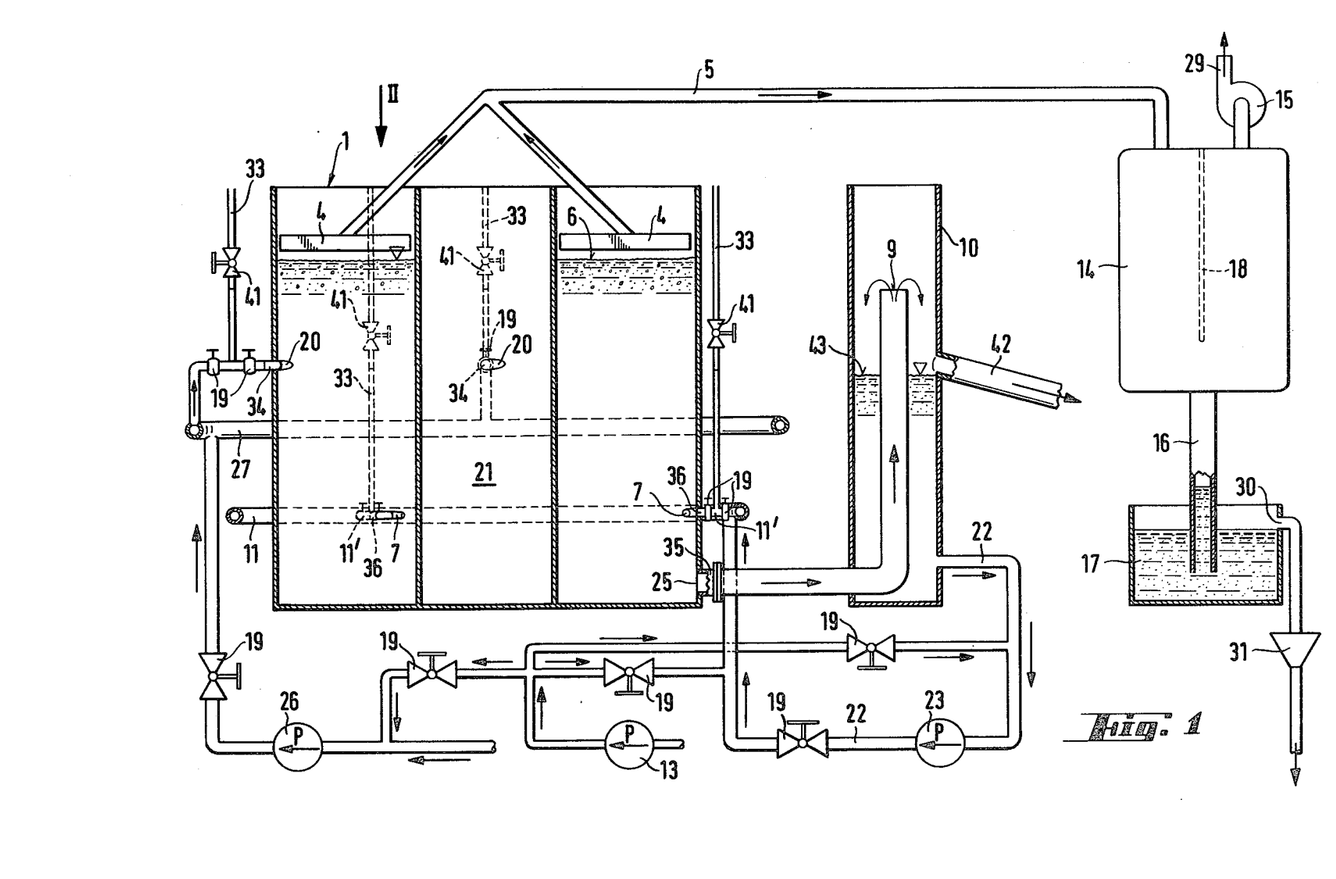
FIG. 1 shows the sectional front view of a de-inking plant.

The chemically and physically already disintegrated waste paper pulp is conducted to the distribution pipe 27 through the pump 26 for the pulp suspension. The distribution pipe 27 feeds the pulp suspension to pulp injectors 20 through inlet pipes 34. As is the case for the accept injectors 7 to be described hereinbelow, the pulp injectors 20 have connections 32 for taking in air which connections are connected to an ascending pipe 33 and possibly an air valve 41 and project above the level of the container. When the injectors 7,20 are in operation, the total amount of air which is supplied to the flotation cell 1 can be reduced and thereby regulated by closing the air valve 41. The closed air valve 41 simultaneously prevents the discharge of pulp suspension from the flotation cell 1 when no pulp suspension is admitted to the injectors 7,20. Advantageously, the ascending pipe 33 is constructed transparent at least in the lower region, i.e. in the region of the connection to the injectors 7,20, so that it is possible to check whether pulp suspension is in the ascending pipe 33. This results in a check of the function of the injectors 7,20 whose purpose it is to draw in air when pulp suspension is admitted, i.e., during the state of admission, no pulp suspension must be seen in the ascending pipe 33.

As is the case in the pulp injectors 7, the pulp injectors 20 are closed by valves 19 so that they can be easily replaced, disassembled and cleaned. It is important in this connection that the regulation of the amount of air can be effected by replacing the insert bodies in the injectors. In the same manner, it is possible to change the size of the injectors, i.e. of the pulp injectors 20 and the pulp injectors 7.

Figure 2:
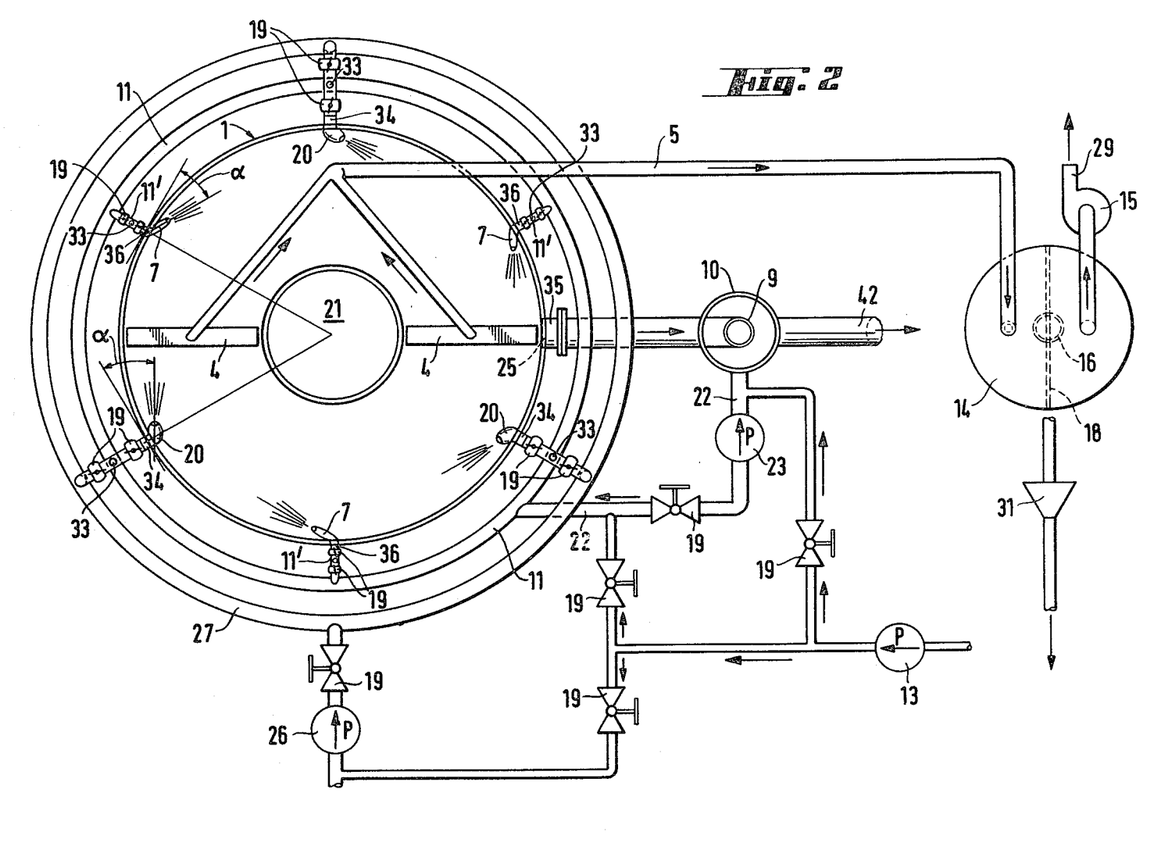
FIG. 2 shows the top view of the same de-inking plant.

As can be seen in FIG. 2, the injection of the pulp suspension is performed at an angle α which is between 10° and 55° relative to the tangent to the circle of the cross-section of the flotation cell. Accordingly, the pulp suspension is injected from different points of the periphery of the flotation cell 1 in such a manner that the entire area, i.e. the complete annular space of the flotation cell, is covered and put into circular motion. Accordingly, the pulp suspension is injected from different points of the periphery of the flotation cell 1 in such a manner that the entire area, i.e. the complete annular space of the flotation cell, is covered and put into circular motion. Accordingly, the pulp suspension is in the flotation cell 1 which is bounded toward the center by the hollow space 21. The hollow space 21 has the purpose of preventing a formation of a vortex in the center of the flotation cell 1. The air bubbles rise toward the top from the pulp suspension and reach the level 6 of the pulp suspension above which the suction nozzles 4 are arranged on the suction pipe 5. The suction nozzles serve to draw off the foam which is laden with dirt particles and are arranged about 60 mm above the level 6 of the pulp suspension; they are constructed as slot nozzles and extend over the entire width of the annular space between the hollow space 21 and the outer wall of the flotation cell 1.

In the flotation cell 1, air bubbles are passed through the pulp suspension, the bubbles rising toward the top level of the suspension. The pulp suspension is drawn from the flotation cell 1 in the counterflow at the accept outlet 25. A portion of the drawn-off accept is again returned to the flotation cell 1 through the accept injectors 7. The accept injectors 7 are arranged at an angle α which is about 25° to 55° relative to the tangent. As a result, they cover in the manner of a fan the entire intermediate space of the circular ring. The accept injectors 7 are connected to an accept pipe 11' on the accept ring pipe 11 which is connected to the accept pump 23 and the white water pump 13. The connection is effected through a check valve 19 each, so that it is possible to use only white water or also only accept. It is further possible to adjust a certain dilution of the accept by the addition of fresh water. The purified pulp suspension leaves the flotation cell 1 in the form of accept through the accept outlet 25 and the outlet pipe 35 and passes the overflow 9 by means of whose height in connection with the supplied amount of pulp suspension the level 6 of the pulp suspension in the flotation cell 1 is regulated. The accept discharged at the overflow 9 reaches the overflow collector 10 to which the accept pump 23 is connected. The overflow collector 10 is provided with an outlet 42 which maintains the accept level 43 in the collector at a constant height and, thus, prevents the accept pump 23 from drawing air. The accept pump 23 delivers the finally processes accept to the accept ring pipe 11 through the accept pipe 22, while, through the outlet 42, excess accept is either supplied to a subsequently arranged flotation cell or reaches the user.

Through the suction pipe 5, the foam drawn off by suction nozzles 4 reaches the separator 14 which is equipped with a fan 15 and contains only a baffle plate 18. The drawn off foam subsides in the separator 14. The released air leaves the exhaust air pipe by means of the fan 15. The dirt particles of the foam which are now bound to the water reach the dirt collector 17 through the gravity pipe 16. The dirt collector 17 is in communication with the open atmosphere and has an overflow 30 through which the dirt is supplied to a thickening station 31 or possibly to a reprocessing station. Since the separator 14 is under vacuum, i.e. it has a negative pressure of about 0.1 bar, the generated dirt water extends in the gravity pipe 16 above the level of the dirt water in the dirt collector 17.

Figure 3:
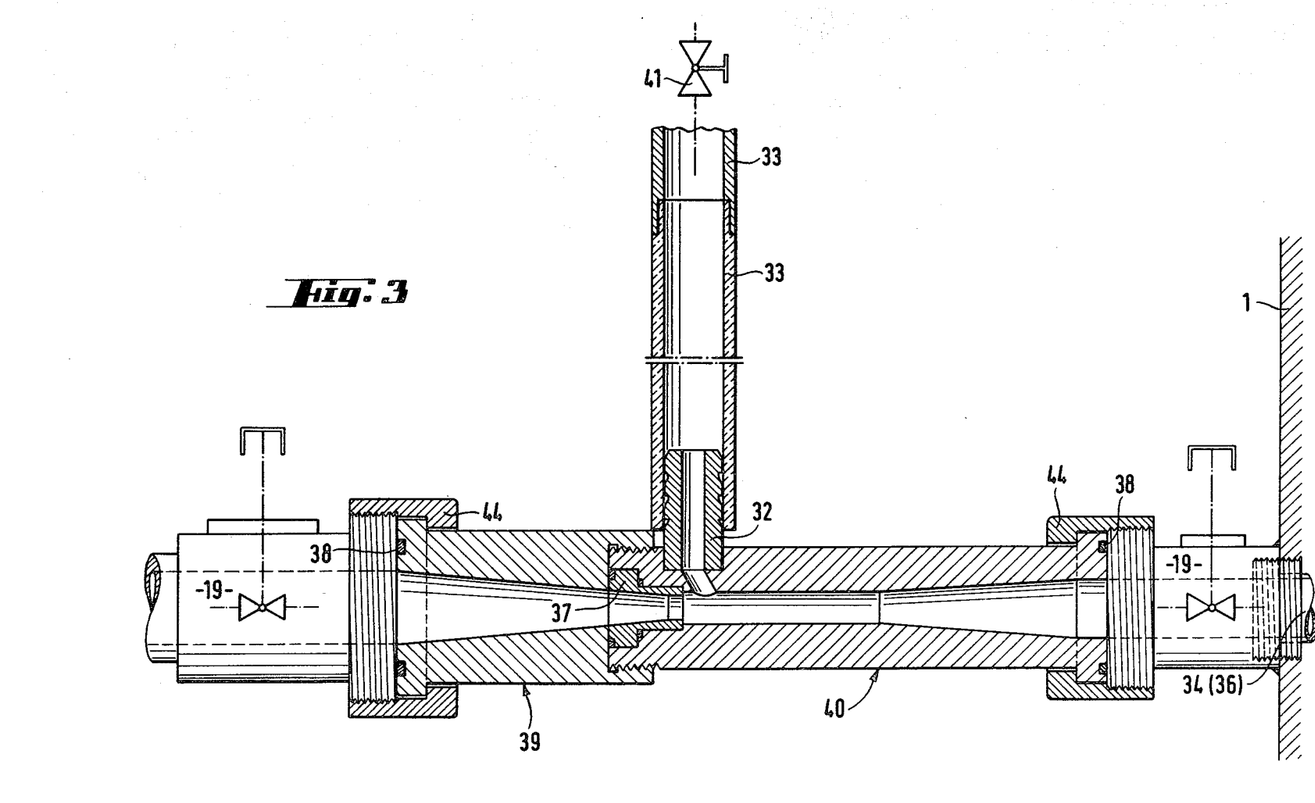
FIG. 3 shows, as a detail, an injector nozzle with connections.

The injector illustrated in FIG. 3 consists of the nozzle body 40 which is screwed onto the funnel 39 and, thus, tightly encloses the insert 37. The insert 37 has a narrow bore of 10 mm and the nozzle body 40, in its rectilinear portion, a bore of 11 mm. The resulting annular gap of ½ mm difference serves for drawing the air through the connection 32 which is provided with the transparent ascending pipe 33 and which can be locked by an air valve 41. The sealing ring 38 serves as a seal toward the inlet or outlet valves 19. The pipes 34, 36 are screwed to the valves 19 by means of a connection nut 44. Accordingly, after closing the valve 19, the nozzles can be removed and cleaned or maintained without difficulties by a simple dismantling of the connection nuts.

Figure 4:
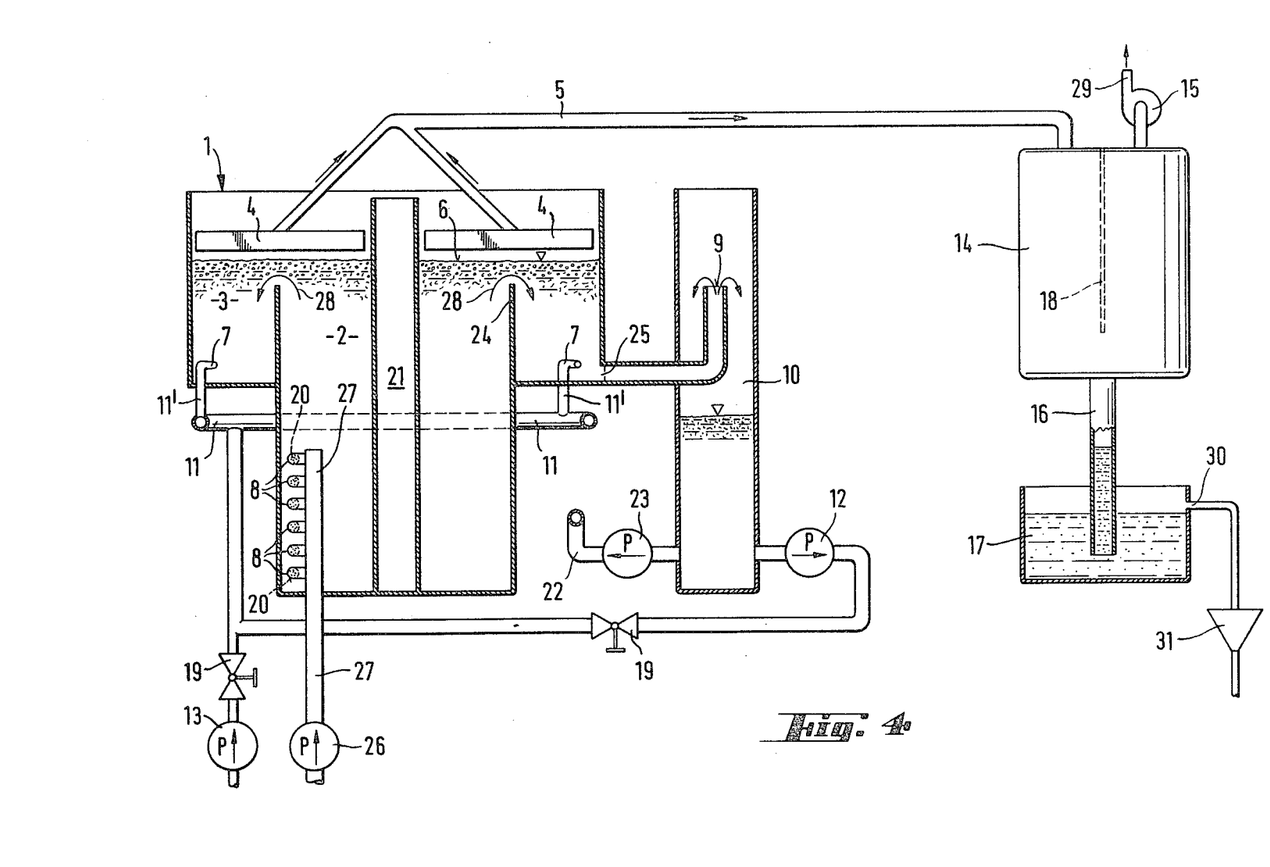
FIG. 4 shows the sectional front view of a divided de-inking plant.

As in FIG. 1, also in FIG. 4, the chemically and physically already disintegrated waste paper pulp is fed to the distribution pipe 27 through the pump 26 for the pulp suspension. The distribution pipe 27 supplies the pulp suspension to sets 8 of injectors which consist of individual pulp injectors 20, wherein always four pulp injectors 20 are combined to a set 8 of injectors. As is the case in the above-described accept injectors 7, the pulp injectors 20 have connections for drawing in air which are connected to an ascending pipe 33 or a valve 19. When the injector 7,20 is in operation, the total amount of air which is supplied to the flotation cell 1 can be reduced and, thus, regulated by closing the valve 19 or by closing the ascending pipe 33. Simultaneously, the closed valve 19 prevents pulp suspension from being discharged from the flotation cell 1 when no pulp suspension is admitted to the injectors 7,20. Advantageously, the ascending pipe 33 is constructed transparent at least in the lower region, i.e. in the region of the connection to the injectors 7,20, so that it is possible to check whether pulp suspension is in the ascending pipe 33. This results in a check of the function of the injectors 7,20 which have the purpose to draw air when pulp suspension is admitted, i.e. in the state of admission, no pulp suspension must be visible in the ascending pipe 33.

Figure 5:
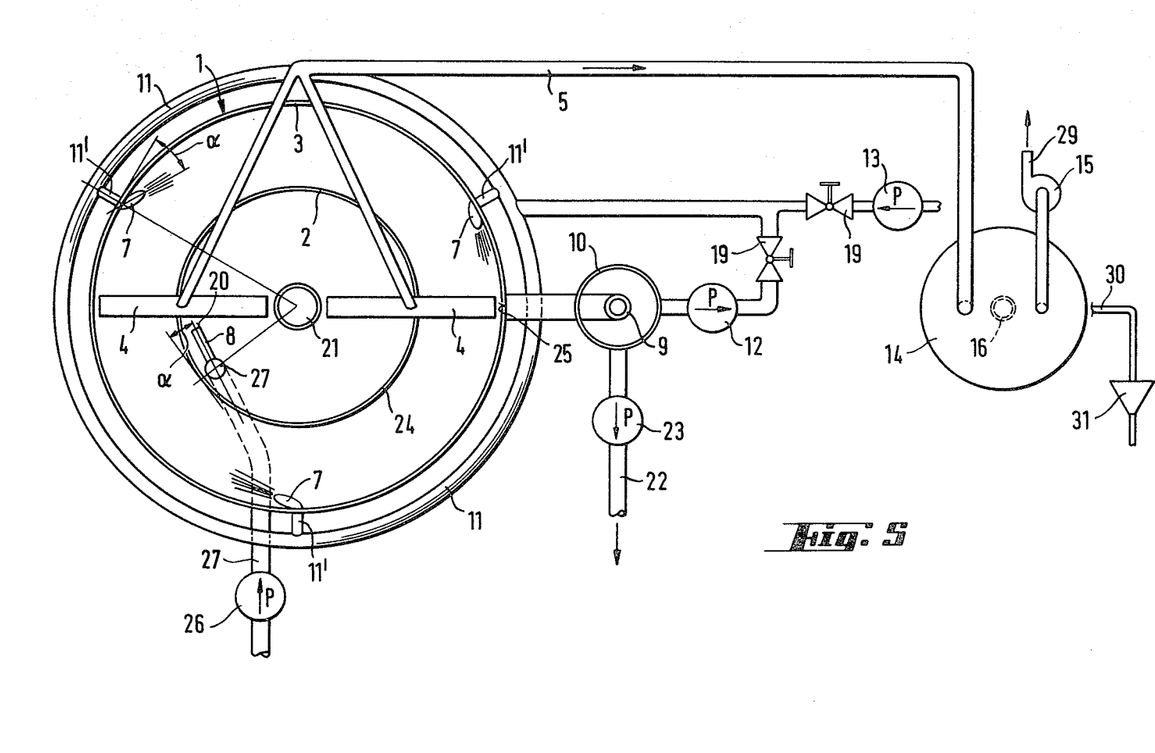
FIG. 5 shows the top view of the divided de-inking plant.

As illustrated, the sets 8 of injectors are arranged at different levels, wherein the distance of the lowermost set 8 of injectors from the bottom of the flotation cell 1 is 100 mm and the distance between the individual sets 8 of injectors in the vertical direction is 150 mm. As can be seen, the pulp suspension is injected at an angle $\alpha$ which is 10° relative to the tangent. Accordingly, the pulp suspension is in the first annular cell 2 which is bounded by the hollow space 21 toward the center and by the weir 24 toward the periphery. In this connection, the hollow space 21 only has the purpose of preventing the formation of a vortex in the center of the flotation cell 1. The air bubbles rise from the pulp suspension toward the top and reach the level 6 of the pulp suspension above which the suction nozzles 4 are arranged on the suction pipe 5. The suction nozzles serve for drawing off the foam which is laden with dirt particles and are arranged 60 mm above the level 6 of the pulp suspension, they are constructed as slot nozzles and extend over the entire width of the annular space between the hollow space 21 and the outer wall of the second annular cell 3.

The pulp suspension flows over the weir 24 in the direction of the arrows 28 and, thus, reaches the second annular cell 3 to which an air-water suspension is admitted through the accept injectors 7. The accept injectors 7 are arranged at an angle $\alpha$ which is 10° to 30° relative to the tangent. As a result, the injectors cover in the manner of a fan the entire intermediate space of the circular ring. The accept injectors 7 are connected to an accept nozzle pipe 11' at the accept ring 11 and are connected to the counterflow pump 12 and the white water pump 13. The connection is effected through a check valve 19 each, so that it is possible to operate either only with white water or also only with accept. It is further possible to adjust a certain dilution of the accept by the addition of white water.

The purified pulp suspension leaves the second annular cell 3 in the form of accept through the accept outlet 25 and passes the overflow 9, the level 6 of the pulp suspension being regulated by the height of the overflow in connection with the supplied amount of pulp suspension. The accept discharged at the overflow 9 reaches the overflow collector 10 to which are connected the counterflow pump 12 and the accept pump 23. Through the accept pipe 22, the accept pump 23 delivers the finally processed accept to the user, i.e. to the paper machine, not shown, or to an intermediate collector arranged at the inlet side.

We claim:

1. In a method of de-inking pulp suspensions by means of flotation, in which the air-laden pulp suspension is introduced into a flotation cell, the foam with the impurities forming on the surface of said pulp suspension is removed and purified pulp suspension accept is drawn off, the improvement which comprises supplying the air-laden pulp suspension to the top region of a flotation cell, drawing off a portion of the accept in the form of purified pulp suspension from the bottom region of said flotation cell, and supplying an air-water suspension to said flotation cell in the region above the accept outlet and conducting said air-water suspension in the counterflow to the sinking accept fibers.

2. Method according to claim 1 wherein said air-water suspension is accept which is conducted in circulation.

3. Method according to claim 1 or 2 wherein the returned amount of accept is between 10 and 150% of the total accept.

4. Method according to claim 1 or 2 wherein said air-laden pulp suspension is supplied to said flotation cell at several points distributed over the entire circumference.

5. Method according to claim 1 or 2 wherein the pulp is supplied to said flotation cell at an angle α of between 10° and 55° relative to the tangent to the circle of the cross-section of said flotation cell.

6. Method according to claim 1 or 2 wherein said air-water suspension is supplied at several points distributed over the circumference of said flotation cell.

7. Method according to claim 1 or 2 wherein said air-water suspension is injected into said flotation cell at an angle α of between 0° and 30° relative to the tangent and said pulp suspension is put into a circular motion.

8. Method according to claim 1 or 2 wherein in a divided flotation cell, said pulp suspension, rising from the bottom region of a first section, flows over a weir arranged between the first and the second sections, sinks downwardly in said second section and is drawn off from the bottom region, while, simultaneously, an air-water suspension is supplied in a counterflow and the foam accumulating on the surfaces of the suspension in both sections is drawn off.

9. Method according to claim 1 or 2 wherein in a divided flotation cell, said pulp suspension, rising from the bottom region of a first section, flows over a weir arranged between the first and the second sections, sinks downwardly in said second section and is drawn off from the bottom region, while, simultaneously, an air-water suspension is supplied in a counterflow and the foam accumulating on the surfaces of the suspension in both sections is drawn off and as said air-water suspension, a portion of the accept taken from said second section is returned, after a renewed foaming, to the bottom range of said second section above the accept outlet.

10. Method according to claim 1 or 2 wherein in a divided flotation cell, said pulp suspension, rising from the bottom region of a first section, flows over a weir arranged between the first and the second sections, sinks downwardly in said second section and is drawn off from the bottom region, while, simultaneously, an air-water suspension is supplied in a counterflow and the foam accumulating on the surfaces of the suspension in both sections is drawn off and said air-water suspension is supplied to said second section at several points distributed over the entire circumference.

11. Arrangement for de-inking pulp suspensions by means of flotation, in which the air-laden pulp suspension is introduced into a flotation cell, the foam with the impurities forming on the surface of said pulp suspension is removed and purified pulp suspension is drawn off, composed of an annular flotation cell with units assigned to said cell for the drawing off of foam and for aeration, and systems for supplying and removing pulp suspension to said annular flotation cell, wherein
in said annular flotation cell(1),
(a) the inlet pipe or pipes (34) for said pulp suspension are arranged between 300 and 1000 mm below the level (6) of said pulp suspension,
(b) the outlet pipe (35) is arranged approximately at the level of the bottom,
(c) the after-aeration pipe or pipes (36) are arranged 300 to 500 mm above said outlet pipe (35) and 300–1700 mm below said inlet pipe or pipes(34),
(d) said inlet pipes (34) and said after-aeration pipes (36) are directly connected to injectors (7,20), and
(e) said injectors (7,20) are connected to ascending pipes (33) for drawing in air, said ascending pipes (33) being transparent at least in the immediate region of said nozzles (7,20).

12. Arrangement for de-inking pulp suspensions by means of flotation, in which the air-laden pulp suspension is introduced into a flotation cell, the foam with the impurities forming on the surface of said pulp suspension is removed and purified pulp suspension is drawn off, composed of an annular flotation cell with units assigned to said cell for the drawing off of foam and for aeration, and systems for supplying and removing pulp suspension to said annular flotation cell, wherein
in said annular flotation cell (1),
(a) the inlet pipe or pipes (34) for said pulp suspension are arranged between 300 and 1000 mm below the level (6) of said pulp suspension,
(b) the outlet pipe (35) is arranged approximately at the level of the bottom,
(c) the after-aeration pipe or pipes (36) are arranged 300 to 500 mm above said outlet pipe (35) and 300–1700 mm below said inlet pipe or pipes (34), and
(d) ascending pipes (33) extend above the filling level of said annular flotation cell (1).

13. Arrangement for de-inking pulp suspensions by means of flotation, in which the air-laden pulp suspension is introduced into a flotation cell, the foam with the impurities forming on the surface of said pulp suspension is removed and purified pulp suspension accept is drawn off, comprising two annular cells (2, 3) which are arranged essentially concentrically relative to each other and are separated from each other by a weir (24) which facilitates the overflow of pulp suspensions from said first annular cell (2) into said second annular cell (3), and by connections for introducing air-laden pulp suspension at said first annular cell (2), an accept outlet (25) in the bottom region of said second annular cell (3), at least one connection for supplying an additional air-water suspension above said accept outlet (25) of said second annular cell (3) and a device for drawing off the accumulating dirt-laden foam in the top region of both annular cells (2, 3).

14. Arrangement according to claim 13 wherein said accept outlet (25) is composed of an overflow (9) which is connected at the bottom region of said second annular cell (3) and, outside of said annular cell (3), extends essentially to the level of said weir (24).

15. Arrangement according to claim 13 or 14 wherein said weir (24) between said first annular cell (2) and said second annular cell (3) is 30 to 150 mm below the level (6) of said pulp suspension.

16. Arrangement according to claim 13 or 14 wherein said connection or connections for supplying said additional air-water suspension into said second annular cell (3) are arranged 100 to 300 mm above said accept outlet (25).

17. Arrangement according to claim 13 or 14 wherein said first annular cell (2) to which said pulp suspension is admitted in uniflow forms the inner annular cell and said second annular cell (3) to which said pulp suspension is admitted in counterflow forms the outer annular cell.

18. Arrangement according to claim 13 or 14 wherein said injectors (7,20) for supplying said pulp suspension to said first annular cell (2) and said second annular cell (3) are arranged at an angle of between 0° and 30° relative to the tangent, wherein said injectors (7,20), at least in one annular cell (2,3), are arranged at different angles relative to one another.

* * * * *